US012670402B2

(12) United States Patent
Arpit

(10) Patent No.: US 12,670,402 B2
(45) Date of Patent: Jun. 30, 2026

(54) MOMENTUM CONTRASTIVE AUTOENCODER

(71) Applicant: Salesforce, Inc., San Francisco, CA (US)

(72) Inventor: Devansh Arpit, Pacifica, CA (US)

(73) Assignee: Salesforce, Inc., San Francisco, CA (US)

( * ) Notice: Subject to any disclaimer, the term of this patent is extended or adjusted under 35 U.S.C. 154(b) by 1226 days.

(21) Appl. No.: 17/154,401

(22) Filed: Jan. 21, 2021

(65) Prior Publication Data

US 2022/0108183 A1 Apr. 7, 2022

Related U.S. Application Data

(60) Provisional application No. 63/086,579, filed on Oct. 1, 2020.

(51) Int. Cl.
*G06N 3/088* (2023.01)
*G06N 3/045* (2023.01)

(52) U.S. Cl.
CPC .............. *G06N 3/088* (2013.01); *G06N 3/045* (2023.01)

(58) Field of Classification Search
CPC ...... G06N 3/088; G06N 3/045; G06N 3/0455; G06N 3/0475; G06N 3/0499; G06N 3/0895; G06N 3/084
See application file for complete search history.

(56) References Cited

U.S. PATENT DOCUMENTS

| | | | | |
|---|---|---|---|---|
| 1,193,493 A | * | 8/1916 | van den Oord et al. ................... A63H 13/12 446/360 |
| 2021/0110262 A1 | * | 4/2021 | Schmitt .................... G06N 3/08 |
| 2021/0312296 A1 | * | 10/2021 | Li ........................... A61B 5/165 |
| 2021/0358177 A1 | * | 11/2021 | Park ....................... G06N 3/045 |
| 2022/0092108 A1 | * | 3/2022 | Collomosse .......... G06F 16/535 |

OTHER PUBLICATIONS

Kim Y, Yoo B, Kwak Y, Choi C, Kim J. Deep generative-contrastive networks for facial expression recognition. arXiv e-prints. (Year: 2019).*
Liu W, Wen Y, Yu Z, Li M, Raj B, Song L. Sphereface: Deep hypersphere embedding for face recognition. InProceedings of the IEEE conference on computer vision and pattern recognition 2017 (pp. 212-220). (Year: 2017).*
Neill Jo. Siamese capsule networks. arXiv preprint arXiv:1805. 07242. May 18, 2018. (Year: 2018).*

(Continued)

*Primary Examiner* — Oluwatosin Alabi
(74) *Attorney, Agent, or Firm* — Haynes and Boone, LLP

(57) ABSTRACT

The embodiments are directed to training a momentum contrastive autoencoder using a contrastive learning framework. The contrastive learning framework learns a latent space distribution by matching latent representations of the momentum contrastive autoencoder to a pre-specified distribution, such as a distribution over a unit hyper-sphere. Once the latent space distribution is learned, samples for a new data set may be obtained from the latent space distribution. This results in a simple and scalable algorithm that avoids many of the optimization challenges of existing generative models, while retaining the advantage of efficient sampling.

20 Claims, 8 Drawing Sheets

(56) References Cited

OTHER PUBLICATIONS

Jaiswal A, Babu AR, Zadeh MZ, Banerjee D, Makedon F. A survey on contrastive self-supervised learning. Technologies. Dec. 28, 2020;9(1):2. (Year: 2020).*

Le-Khac PH, Healy G, Smeaton AF. Contrastive representation learning: A framework and review. Ieee Access. Oct. 16, 2020;8:193907-34. (Year: 2020).*

Zheng X, Wu Z, Meng H, Cai L. Contrastive auto-encoder for phoneme recognition. In2014 IEEE International Conference on Acoustics, Speech and Signal Processing (ICASSP) May 4, 2014 (pp. 2529-2533). IEEE. (Year: 2014).*

Le-Khac, P.H., Healy, G. and Smeaton, A.F., 2020. Contrastive representation learning: A framework and review. Ieee Access, 8, pp. 193907-193934. (Year: 2020).*

Ahmad et al., "A Nonparametric Estimation of the Entropy for Absolutely Continuous Distributions," IEEE Transactions on Information Theory, pp. 372-375, 1976.

Bauer et al., "Resampled Priors for Variational Autoencoders," In Proceedings of the 22nd International Conference on Artificial Intelligence and Statistics (AISTATS) Naha, Okinawa, Japan. PMLR: vol. 89, 10 pages, 2019.

Bousquet et al., "From optimal transport to generative modeling: the VEGAN cookbook," arXiv preprint arXiv:1705.07642, 15 pages, May 22, 2017.

Che et al., "Mode Regularized Generative Adversarial Networks," In ICLR 2017, 12 pages, Dec. 18, 2016.

Chen et al., "Variational Lossy Autoencoder," In ICLR 2017, 13 pages, Nov. 8, 2016.

Chen et al., "A Simple Framework for Contrastive Learning of Visual Representations," In Proceedings of the 37th International Conference on Machine Learning, Vienna, Austria, PMLR 119, 20 pages, Jul. 1, 2020.

Dai et al., "Diagnosing and Enhancing VAE Models," arXiv preprint arXiv:1903.05789, 44 pages, Oct. 30, 2019.

Donahue et al., "Adversarial Feature Learning," arXiv preprint arXiv:1605.09782, 17 pages, Nov. 4, 2016.

Dumoulin et al., "Adversarially Learned Inference," In ICLR 2017, 16 pages, Dec. 13, 2016.

Goodfellow et al., "Generative Adversarial Nets," In Advances in Neural Information Processing Systems, 9 pages, 2014.

Gretton et al., "A Kernel Two-Sample Test," The Journal of Machine Learning Research, 13(1). pp: 723-773, Mar. 2012.

Grill et al., "Bootstrap Your Own Latent A New Approach to Self-Supervised Learning," arXiv preprint arXiv:2006.07733, 35 pages, Sep. 10, 2020.

He et al., "Momentum Contrast for Unsupervised Visual Representation Learning," In Proceedings of the IEEE/CVF Conference on Computer Vision and Pattern Recognition, pp. 9729-9738, 2020.

Kingma et al., "Auto-Encoding Variational Bayes," arXiv preprint arXiv:1312.6114, 14 pages, Dec. 27, 2013.

Kingma et al., "Improving Variational Inference with Inverse Autoregressive Flow," In Advances in Neural Information Processing Systems, 10 pages, Jun. 15, 2016.

Kolouri et al., "Sliced-Wasserstein Autoencoders: an Embarrassingly Simple Generative Model," In ICLR 2019, 25 pages, 2019.

Tabor et al., "Cramer-Wold AutoEncoder," arXiv preprint arXiv:1805.09235, 13 pages, Oct. 4, 2018.

Tolstikhin et al., "Wasserstein Auto-Encoders," arXiv preprint arXiv:1711.01558, 13 pages, Dec. 19, 2017.

Tomczak et al., "VAE with a VampPrior," In Proceedings of the 21st International Conference on Artificial Intelligence and Statistics (AISTATS) 2018, Lanzarote, Spain. PMLR: vol. 84, 16 pages, Feb. 26, 2018.

Van Den Oord et al. "Neural Discrete Representation Learning," In 31st Conference on Neural Information Processing Systems (NIPS 2017), Long Beach, CA, USA, 10 pages, Nov. 2, 2017.

Wang et al., "Understanding Contrastive Representation Learning through Alignment and Uniformity on the Hypersphere," In Proceedings of the 37th International Conference on Machine Learning, Online, PMLR 119, 41 pages, Nov. 10, 2020.

Zhao et al., "Towards a Deeper Understanding of Variational Autoencoding Models," arXiv preprint arXiv:1702.08658, 11 pages, Feb. 28, 2017.

* cited by examiner

200A

Input Data
140

Momentum Contrastive Autoencoder
130

Encoder
205

Latent
Representation
215

Decoder
210

Output Data
150

300

Algorithm 1 PyTorch-like pseudocode of Momentum Contrastive Autoencoder algorithm

```
# Enc_q, Enc_k: encoder networks for query and key. Their outputs are L2 normalized
# Dec: decoder network
# Q: dictionary as a queue of K randomly initialized keys (dxK)
# m: momentum
# lambda: regularization coefficient for entropy maximization
tau: logit temperature for x in data_loader:   # load a minibatch x with B samples
  z_q = Enc_q(x)   # queries: Bxd
  z_k = Enc_k(x).detach()   # keys: Bxd, no gradient through keys
  x_rec = Dec(z_q)   # reconstructed input positive logits: Bx1
  l_pos = bmm(z_q.view(B,1,d), z_k.view(B,d,1))

# negative logits: BxK
  l_neg = mm(z_q.view(B,d), Q.view(d,K))

# logits: Bx(1+K)
  logits = cat([l_pos, l_neg], dim=1)

# compute loss
  labels = zeros(B)   # positive elements are in the 0-th index
  L_con = CrossEntropyLoss(logits/tau, labels)   # contrastive loss maximizing entropy of z_q
  L_rec = ((x_rec - x) ** 2).sum() / B   # reconstruction loss
  L = L_rec + lambda * L_con   # momentum contrastive autoencoder loss update Enc_q and Dec networks
  L.backward()
  update(Enc_q.params)
  update(Dec.params)

# update Enc_k
  Enc_k.params = m * Enc_k.params + (1-m) * Enc_q.params update dictionary
  enqueue(Q, z_k)   # enqueue the current minibatch
  dequeue(Q)   # dequeue the earliest minibatch
```

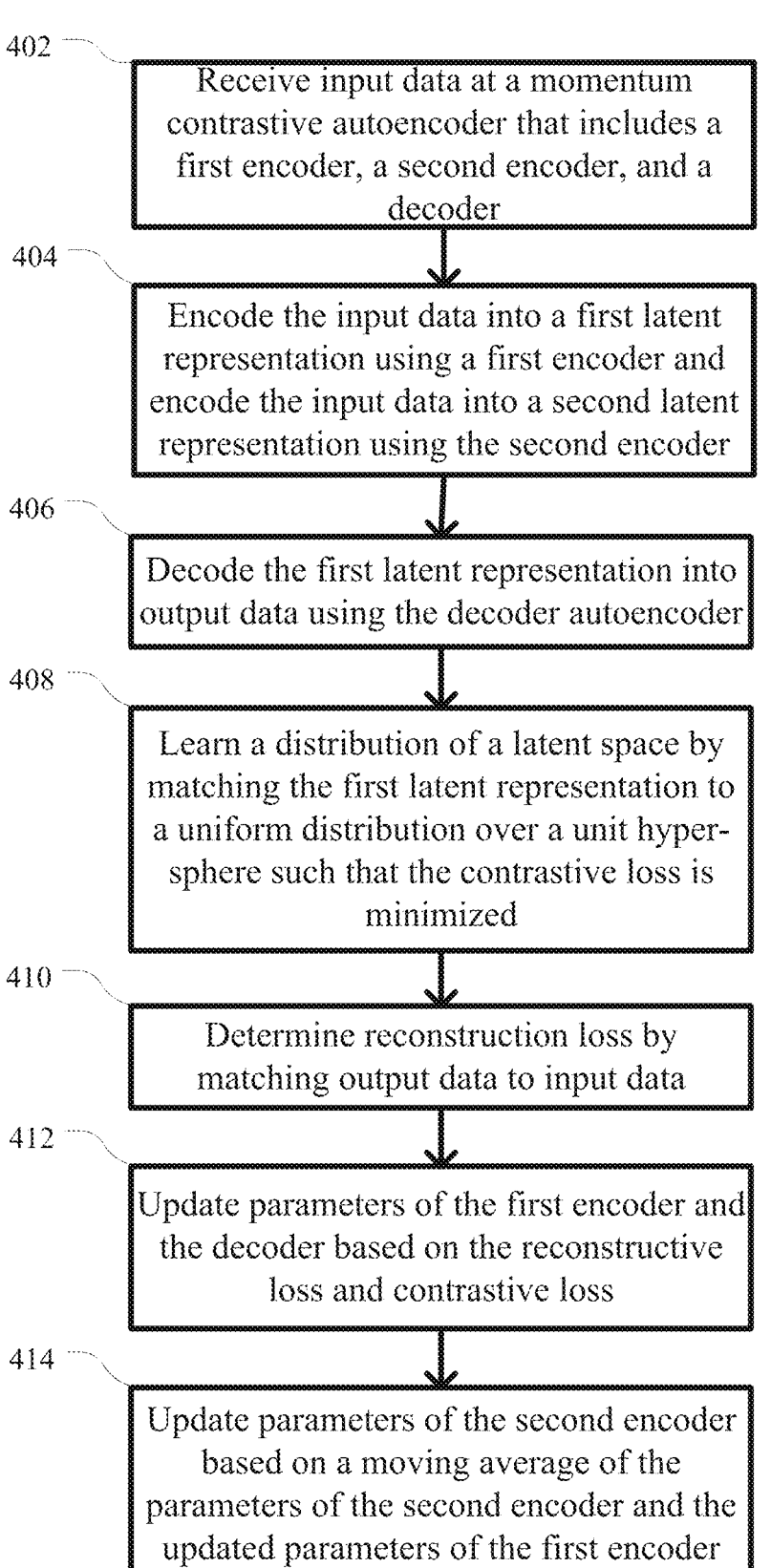

400

402 — Receive input data at a momentum contrastive autoencoder that includes a first encoder, a second encoder, and a decoder 404 — Encode the input data into a first latent representation using a first encoder and encode the input data into a second latent representation using the second encoder 406 — Decode the first latent representation into output data using the decoder autoencoder 408 — Learn a distribution of a latent space by matching the first latent representation to a uniform distribution over a unit hyper-sphere such that the contrastive loss is minimized 410 — Determine reconstruction loss by matching output data to input data 412 — Update parameters of the first encoder and the decoder based on the reconstructive loss and contrastive loss 414 — Update parameters of the second encoder based on a moving average of the parameters of the second encoder and the updated parameters of the first encoder

Select samples from the distribution of the latent space learned by mapping the first latent representation over the unit hyper-sphere Generate a new data set from the selected samples using a decoder of the momentum contrastive autoencoder

600

700
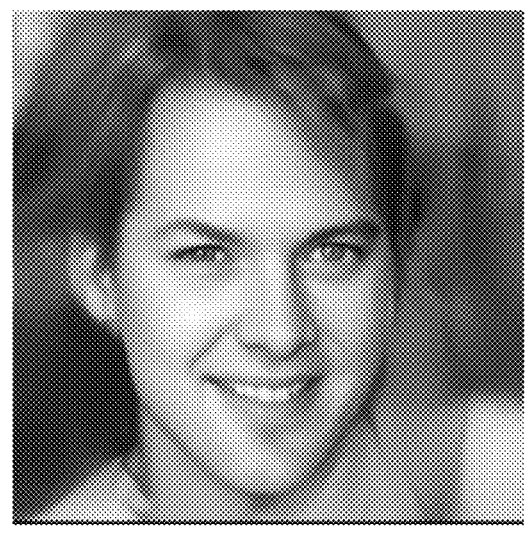
*FIG. 7*

MOMENTUM CONTRASTIVE AUTOENCODER

CROSS-REFERENCE TO RELATED APPLICATIONS

This application is a nonprovisional of and claims priority under 35 U.S.C. 119 to U.S. Provisional Application No. 63/086,579, filed Oct. 1, 2020, which is hereby expressly incorporated by reference herein in its entirety.

TECHNICAL FIELD

The embodiments relate generally to an autoencoder, and more specifically to an autoencoder that generates new samples from a data distribution.

BACKGROUND

One use for generative modeling is to learn a given data distribution and then facilitate an efficient way to draw samples from that data distribution. Popular autoencoders such as variational autoencoders (VAEs) and generative adversarial networks (GANs) are theoretically-grounded models designed for this purpose. However, the VAEs suffer from a posterior collapse problem and a mismatch between a posterior distribution and prior distribution. The GANs are known to have the mode collapse problem and optimization instability due to their saddle point problem formulation.

BRIEF DESCRIPTION OF THE DRAWINGS

FIG. 3 is an algorithm for training a momentum contrastive autoencoder, according to some embodiments.

FIG. 4 is a flowchart of method for training a momentum contrastive autoencoder, according to some embodiments.

FIG. 7 illustrates new images generated by a momentum contrastive autoencoder, according to some embodiments.

In the figures, elements having the same designations have the same or similar functions.

DETAILED DESCRIPTION

A Wasserstein autoencoder (WAE) proposes a general theoretical framework that may avoid issues associated with the VAEs and GANs. The WAE illustrates that a divergence between the prior and marginal distributions is equivalent to the minimum reconstruction error under the constraint that the marginal distribution of the latent space is identical to a prior distribution. The embodiments are directed to a momentum contrastive autoencoder that is trained to match the latent space distribution to a prior distribution. Once the momentum contrastive autoencoder is trained, the momentum contrastive autoencoder may sample data for a new data set from either distribution.

The embodiments are also directed to a contrastive learning framework that trains the momentum contrastive autoencoder. The contrastive learning framework may achieve state-of-the-art results in self-supervised representation learning tasks by forcing the latent representations to be augmentation invariant and distinct for different data samples. Further, the contrastive learning framework may achieve maximum entropy over the unit hyper-sphere by matching the contrastive loss term of the latent representation to the uniform distribution over the unit hyper-sphere. Once the momentum contrastive autoencoder is trained, new data samples may be generated from the model using ancestral sampling. This approach avoids the optimization challenges of existing VAE and GAN frameworks and results in a simple and scalable algorithm for generative modeling.

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Figure 1:
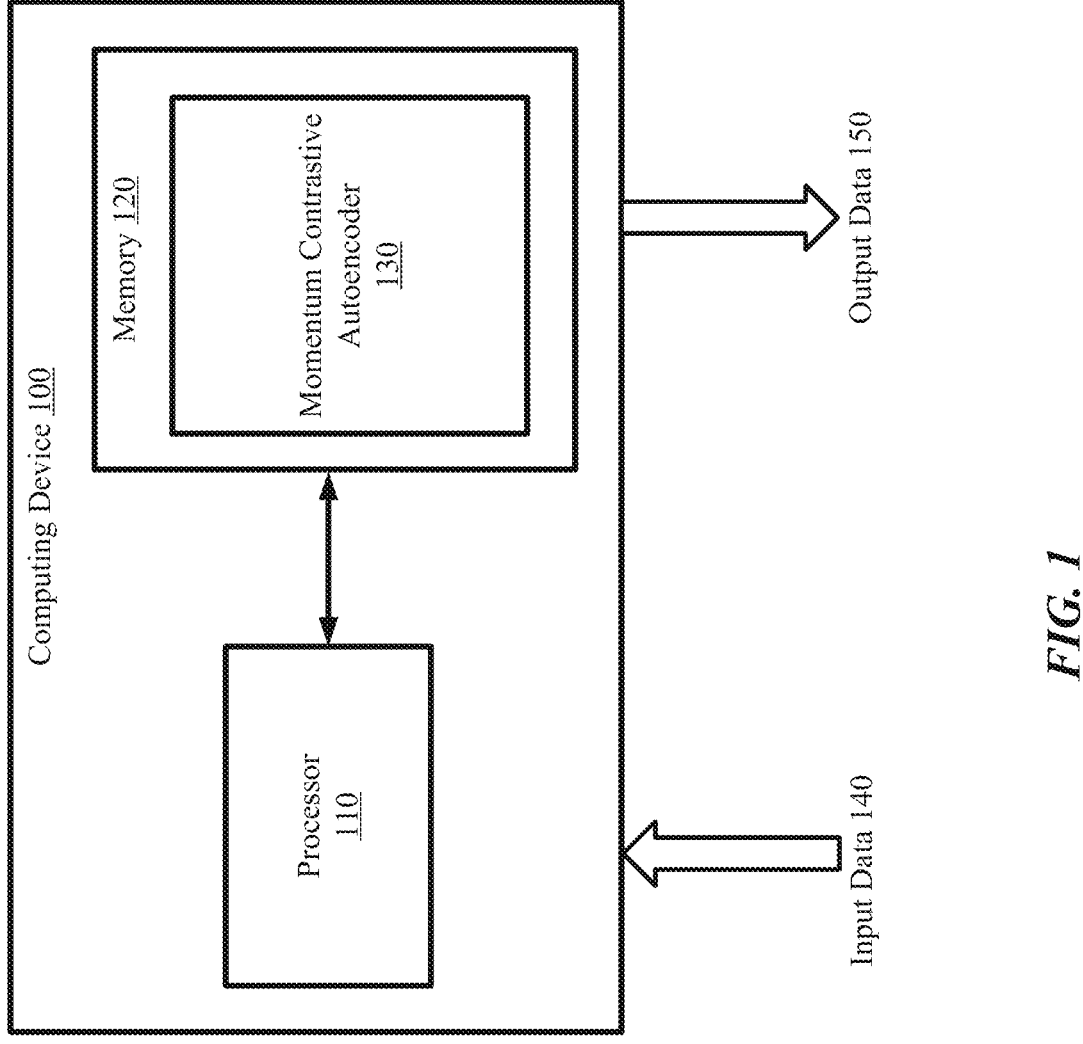
FIG. 1 is a simplified diagram of a computing device where the embodiments can be implemented.

FIG. 1 is a simplified diagram of a computing device 100, according to some embodiments. As shown in FIG. 1, computing device 100 includes a processor 110 coupled to memory 120. Operation of computing device 100 is controlled by processor 110. And although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities.

In some examples, memory 120 may include a non-transitory, tangible, machine readable media that includes executable code that when run by one or more processors (e.g., processor 110) may cause the one or more processors to perform the methods described in further detail herein. For example, as shown, memory 120 includes instructions for a momentum contrastive autoencoder 130. Momentum contrastive autoencoder 130 may be a neural network that includes one or more networks or modules. Momentum contrastive autoencoder 130 may receive input data 140, pass the input data 140 through one or more networks, and produce an output data 150. Input data 140 and output data 150 may include any type of data, including image data, text data, etc. In some embodiments, output data 150 may be a copy or an approximate copy of the input data 140. For example, if an image includes an image of a human face, the output may be a copy or an approximation of an image with the same human face. In other embodiments, output data 150 may include a data set with new sample data. In this case, output data 150 may include an image with an entirely different face. The data set with the new data set may be used to train other encoders, neural networks, and other components in machine learning systems.

Figure 2A:
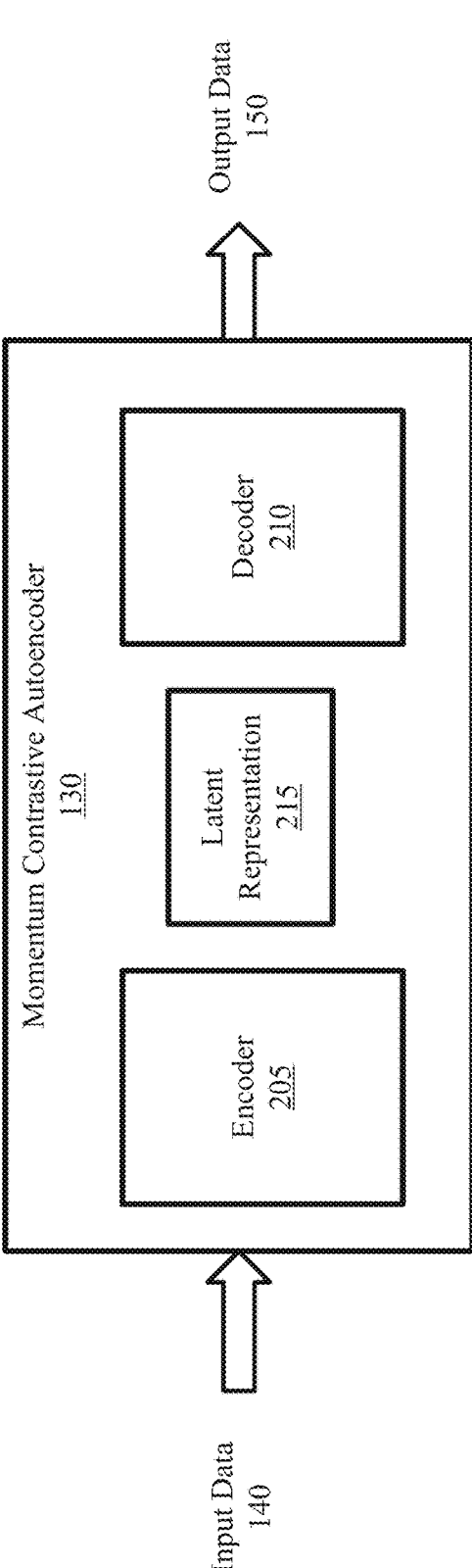
FIG. 2A is a block diagram of a momentum contrastive autoencoder, according to some embodiments.

FIG. 2A is a block diagram 200A of a momentum contrastive autoencoder, according to some embodiments. The momentum contrastive autoencoder 130 may include an encoder 205 and a decoder 210. Both encoder 205 and decoder 210 may be neural networks. Encoder 205 may receive input data 140 and generate a latent representation Z 215 of the input data 140. Decoder 210 may receive the latent representation Z 215 and generate output data 150. In this case, output data 150 may be the same as input data 140. In some embodiments, decoder 210 may also generate new data samples as output data 150 using a distribution of latent representation Z 215 from which decoder 210 selects and processes new latent representation samples. In this case, decoder 210 may be referred to as a data generator.

Figure 2B:
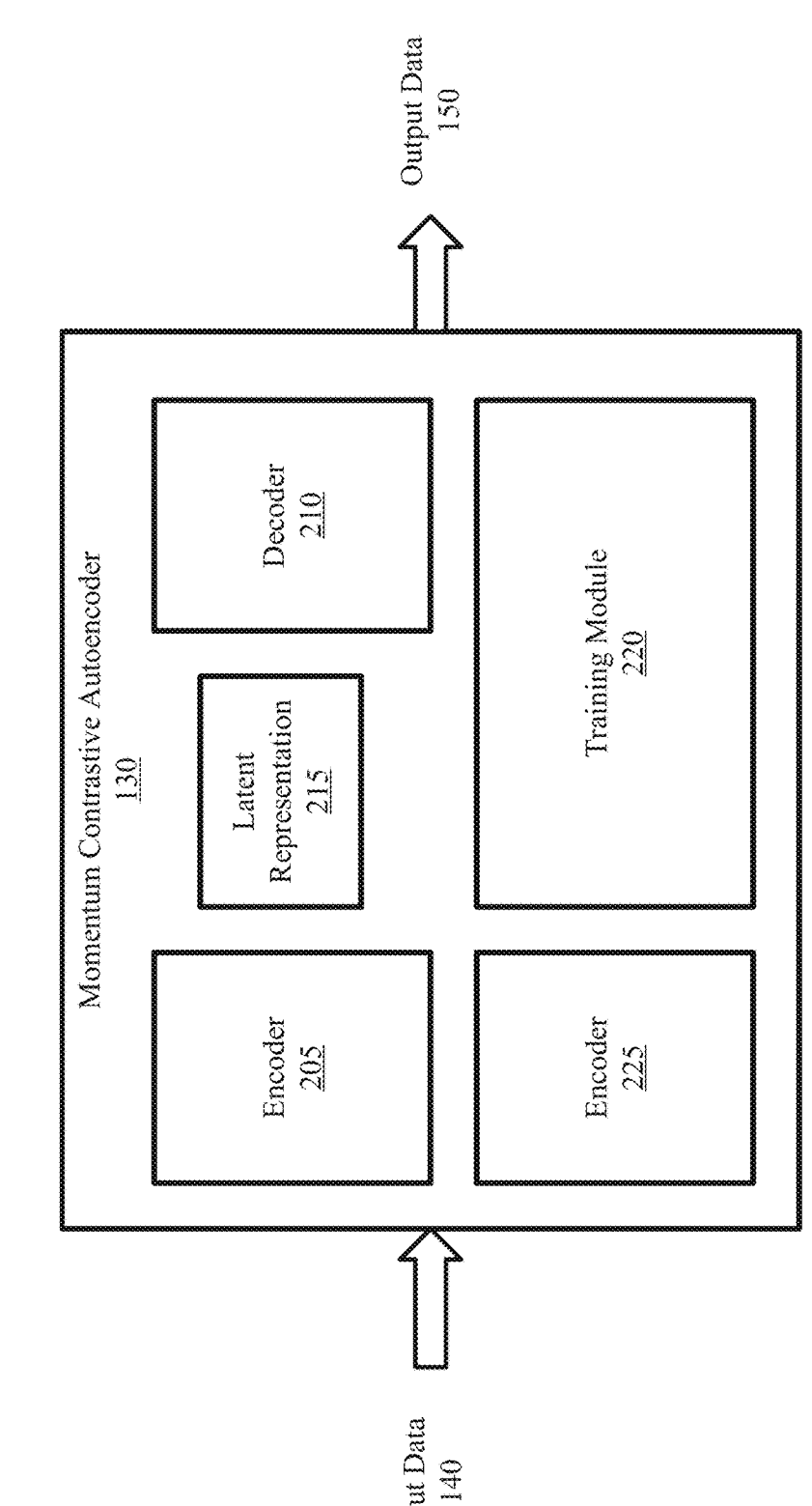
FIG. 2B is a block diagram of a framework for training a momentum contrastive autoencoder, according to some embodiments.

In some embodiments, to generate new data samples, momentum contrastive autoencoder may be trained. FIG. 2B is a block diagram 200B of a momentum contrastive autoencoder, according to some embodiments. As illustrated in FIG. 2B, momentum contrastive autoencoder 130 may include a training module 220. Training module 220 may use a contrastive learning framework to train encoder 205 to generate a distribution of the latent representation Z 215 such that the decoder 210 may sample different latent representations from the distribution and generate new data samples as output data 150. In particular, training module 220 may include a contrastive learning framework that trains encoder 205 to generate latent representation Z 215 with a distribution that is uniform over the unit hypersphere.

In some embodiments, training module 220 of momentum contrastive autoencoder 130 may implement a WAE theorem that connects the autoencoder loss with the Wasserstein divergence between prior and marginal distributions. Typically, a prior distribution is a distribution which can be easily sampled from (e.g. a multivariate uniform distribution), while the marginal distribution is the latent representation of the autoencoder. Specifically, let $X \sim P_X$ be a random variable sampled from the real data distribution on X (input data 140), let $Z \sim Q(Z|X)$ be its latent representation in $\mathcal{Z} \subseteq \mathbb{R}^d$ of input data 140 that passed through encoder $Q(Z|X)$ (encoder 205), and let $\hat{X}=g(Z)$ be output data 150 which is a reconstruction of X determined by a deterministic decoder/generator g: $\mathcal{Z} \to \mathcal{X}$ (decoder 210). In some embodiments, encoder $Q(Z|X)$ may also be deterministic in the WAE framework. In this case, let $$f(X) \stackrel{dist}{=} Q(Z|X)$$

for some deterministic encoder f: $\mathcal{X} \to \mathcal{Z}$, which means encoder 205 may also be encoder $_f$.

In some embodiments, let $P_Z$ be a prior distribution on the latent representation $\mathcal{Z}$ 215, let $P_g=g \#P_z$ be the push-forward of $P_z$ under decoder g 210 (i.e. the distribution of $\hat{X}=g(Z)$ when $g \sim P_z$), and let $Q_Z=f \#P_X$ be the push-forward of $P_X$ under encoder f. Then, $$W_c(P_X, P_g) = \tag{1}$$

$$\inf_{\substack{Q:Q_z=P_z \\ Z \sim Q(Z|X)}} \mathbb{E}_{X \sim P_X}[c(X, g(Z))] = \inf_{f:f \#P_X=P_Z} \mathbb{E}_{X \sim P_X}[c(X, g(f(X)))]$$

1 where $W_c$ denotes the Wasserstein distance for some measurable cost function C.

Equation 1 indicates that the Wasserstein distance between the true data distribution ($P_X$) and generated data distribution ($P_g$) may be equivalently computed by finding the minimum reconstruction loss with respect to encoder $_f$ 205, under the constraint that the marginal distribution of the latent variable $Q_Z$ matches the prior distribution $P_Z$. Thus, the Wasserstein distance may be minimized by jointly minimizing the reconstruction loss with respect to for both encoder $_f$ (encoder 205) and decoder g (decoder/generator 210) as long as the above constraint is met.

In some embodiments, the encoder $f: \mathcal{X} \to \mathbb{R}^d$ (encoder 205) may be parameterized such that the latent representation $Z=f(X)$ has unit $\ell_2$ normalization. The distribution of the latent representation Z may be matched to the uniform distribution over the unit hyper-sphere $S_d=\{z \in \mathbb{R}^d : \|z\|_2=1\}$. When the distribution of the latent variable Z is matched to the unit hyper-$\mathbb{R}$ sphere $S_d$, the samples in the distribution of the latent variable Z are uniformly distributed over the hyper-sphere $S_d$. In some embodiments, matching the distribution of the latent variable Z to the unit hyper-sphere $S_d$ may be accomplished by using the "negative sampling" component of the contrastive loss used in self-supervised learning, as shown in Equation 2 below:

$$L_{neg}(f; \tau, K) = \mathbb{E}_{\substack{x \sim P_X \\ \{x_i^-\}_{i=1}^K \sim P_X}} \left[ \log \frac{1}{K} \sum_{j=1}^K e^{f(x)^T f(x_j^-)/\tau} \right] \tag{2}$$

2

In Equation 2, encoder $f: \mathcal{X} \to S_d$ (encoder 205) may be a neural network that generates an output that has a unit $\ell_2$ normalization, $\tau$ may be a temperature hyperparameter, and K may be a number of samples, which may be another hyperparameter in some embodiments. Further, for any fixed step t, when $K \to \infty$:

$$\lim_{K \to \infty} (L_{neg}(f; \tau, K) - \log K) = \mathbb{E}_{x \sim P_X} \left[ \log \mathbb{E}_{x^- \sim P_X} \left[ e^{f(x)^T f(x^-)/\tau} \right] \right] \tag{3}$$

In some embodiments, the limit in Equation 3 may be minimized when the push-forward $f \#P_X$ (i.e. the distribution of the random variable $Z=f(X)$ when $X \sim P_X$) is uniform on the unit hyper-sphere $S_d$. The Monte Carlo approximation of Equation 2 (with mini-batch size B and K such that $B \leq K < \infty$), shown below:

$$L_{neg}^{MC}(f; \tau, K, B) = \frac{1}{B} \sum_{i=1}^{B} \log \frac{1}{K} \sum_{j=1}^{K} e^{f(x_i)^T f(x_j)/\tau} \tag{4}$$

3 may be a consistent estimator (up to a constant) of the entropy of $f\#P_X$ called the redistribution estimate. Notably, if $$k(x_i; t, K) := \sum_{j=1}^{K} e^{f(x_i)^T f(x_j)/t}$$

is an un-normalized kernel density estimate of $f(x_i)$ using the independent and identically distributed samples $$\{x_j\}_{j=1}^{K},$$

then $$-L_{neg}^{MC}(f; t, K, B) = -\frac{1}{B} \sum_{i=1}^{B} \log k(x_i; t, K).$$

Thus, minimizing the negative component of the contrastive loss $L_{neg}$ (and importantly)

$$L_{neg}^{MC}$$

maximizes the entropy of $f\#P_X$.

In some embodiments, by letting the prior distribution $P_z$ be the uniform distribution over the unit hyper-sphere $S_d$, the regularized loss may be minimized as follows:

$$L(f, g; \lambda, \tau, B, K) = \frac{1}{B} \sum_{i=1}^{B} \|x_i - g(f(x_i))\|_2^2 + \lambda L_{neg}^{MC}(f; \tau, K, B) \tag{5}$$

4

In some embodiments, once training module 220 determines a distribution of the latent variable Z that is uniformly distributed over the unit hyper-sphere $S_d$, that is, the distribution that minimizes regularized loss, momentum contrastive autoencoder may use the distribution to generate new samples as output data 150.

As discussed above, training module may train momentum contrastive autoencoder 130 using a contrastive learning framework. During training, encoder 205 and decoder 210 are trained until loss that includes contrastive loss and reconstruction loss is minimized. In the embodiments below, notation Enc(•) may refer to encoders 205, 225 and Dec(•) may refer to decoder 210 of the momentum contrastive autoencoder 130. Further, the d dimensional output of Enc(•) which is the latent representation Z 215, may be $\ell^2$ normalized, i.e., $$Enc(\cdot) := \frac{f(\cdot)}{\|f(\cdot)\|_2}$$

for some function $f: X \rightarrow \mathbb{R}^d$. The training aims to minimize the loss L(Enc, Dec; $\lambda$, $\tau$, B, K) based on the theory above, where $\lambda$ is the regularization weight, $\tau$ is the temperature hyperparameter, B is the mini-batch size, and $K \geq B$ is the number of samples used to estimate the negative component of the constructive loss $L_{neg}$.

In some embodiments, the momentum contrastive learning framework of training module 220 may determine $L_{neg}$. In the contrastive learning framework may train encoder 205 using decoder 210 and encoder 225. Encode 205 and 225 may have the same neural network structure, but with parameters that have different values. After training, encoder 205 may be used to generate output data 150, including new data samples, while encoder 225 is discarded or used to train encoder 205. Let $Enc_t$ (encoder 205) be parameterized by $\theta_t$ at step t of training, where $\theta_t$ denotes the value of the parameters of the autoencoder at step t. Then, let $Enc'_t$ be encoder 225 that is parameterized by the exponential moving average $$\tilde{\theta}_t = (1 - m) \sum_{i=1}^{t} m^{t-i} \theta_i.$$

Letting $x_1, \ldots, x_K$ be K most recent training examples, and letting $t(j) = t - \lfloor j/B \rfloor$ be the time at which $x_j$ appears in a training mini-batch, the negative component of the contrastive loss $L_{neg}$ at step t may be determined as:

$$L_{MoCo} = \frac{1}{B} \sum_{i=1}^{B} \log \frac{1}{K} \sum_{j=1}^{K} \exp\left(\frac{Enc_t(x_i)^T Enc'_{t(j)}(x_j)}{\tau}\right) - \frac{1}{B} \sum_{i=1}^{B} \frac{Enc_t(x_i)^T Enc'_{t(j)}(x_j)}{\tau} \tag{6}$$

5

The approach in Equation 6 allows the training module 220 to use latent vectors of inputs outside of the current mini-batch without re-computing the latent vectors. This offers substantial computational advantages over other conventional contrastive learning frameworks. Forcing the parameters of Enc' (encoder 225) to evolve according to an exponential moving average is necessary for training stability, as is the second term encourages similarity between $Enc_t(x_i)$ and $Enc'_t(x_i)$ (so-called "positive samples" in the terminology of contrastive learning).

In some embodiments, the exponential moving average parameter m for updating the parameters in the network of Enc' (encoder 225) at $t^{th}$ iteration may be defined as $$m = 1 - (1 - m_0) \cdot \left(\cos\left(\frac{\pi t}{T}\right) + 1\right)/2$$

where T is the total number of training iterations, and $m_0$ is the base hyper-parameter.

FIG. 3 is a pseudo-code of an algorithm 300 for training the momentum contrastive autoencoder 130, according to some embodiments. Algorithm 300 may be included in training module 220 discussed above. For training purposes, algorithm 300 may include two encoders, encoder Enc_q which corresponds to encoder 205 and $Enc_t$, and encoder Enc_k corresponds to encoder 225 and $Enc'_t$ discussed above. As also discussed above, once encoder Enc_q is trained, momentum contrastive autoencoder 130 may implement encoder Enc_q, but not encoder Enc_k to generate new data samples as output data 150. In some embodiments, encoders Enc_q and Enc_k may have the same neural network structure and the same parameters. During training, however, the parameters in encoders Enc_q and Enc_k may have different values because parameters in encoder Enc_k are updated using a moving average of the parameters in Enc_q.

In some embodiments, algorithm 300 may also include a decoder Dec which corresponds to decoder 210. Once trained, decoder Dec may be used by momentum contrastive autoencoder 130 to generate output data 150 from the latent representation Z 215 or the latent representation samples that may be retrieved from the distribution of the latent representation Z 215.

As illustrated in algorithm 300, at step 302 and 304 encoders Enc_q and Enc_k may receive a data sample x as input, which may be e.g. an image, from a data loader. The data loader may store input data 140 in one or more mini-batches that store data samples. Thus, the data loader may provide the data samples in one or more mini-batches to encoders Enc_q and Enc_k. In some embodiments, the data loader may provide data samples one by one. For each data sample x, the encoder Enc_q may generate a latent variable representation z_q (latent representation 215) and encoder Enc_k may generate a latent variable z_k. Latent variable representations z_q and z_k may be normalized using unit $\ell_2$ normalization.

At step 306, decoder Dec may generate a reconstructed sample x_rec for the data sample x from the latent variable representation z_q. The reconstructed sample x_rec is approximately the same as sample x and differs from sample x by a reconstruction loss.

Next, algorithm 300 may determine a momentum contrastive autoencoder loss in steps 308-312. The momentum contrastive autoencoder loss may include the reconstruction loss L_rec and contrastive loss L_con. As discussed above, the contrastive loss L_con, when minimized, maximizes the entropy or distribution of latent variable representations z_q from multiple data samples over a unit hyper-sphere.

At step 308, algorithm 300 determines the reconstruction loss L_rec. The reconstruction loss L_rec may be a difference between the reconstructed sample x_rec and sample x.

At step 310, algorithm 300 determines the contrastive loss L_con. The contrastive loss may have a positive component and a negative component. The positive component may be based on the latent variable representations z_q and z_k generated by encoders Enc_q and Enc_k respectively. The negative component may be based the latent variable representations z_q and a prior distribution, which in this case may be a distribution over the unit hyper-sphere. The negative component is minimized when the representations of the latent variables z_q are uniformly distributed over the unit hyper-sphere. Minimizing the negative component may minimize the contrastive loss. The minimized contrastive loss L_con may maximize the entropy of latent variable z_q, which occurs when the representations of the latent variables z_q are uniformly distributed over the unit hyper-sphere. This may be accomplished by increasing the distance in the distribution between multiple latent variables z_q and minimizing the distance between the latent variables z_q and z_k for each data sample x.

At step 312, algorithm 300 determines the overall momentum contrastive autoencoder loss by adding the contrastive loss L_con multiplied by a regularization coefficient lambda to the reconstruction loss L_rec.

In some embodiments, algorithm 300 may train encoder Enc_q and decoder Dec by back propagating the momentum contrastive autoencoder loss at step 314 and updating the parameters of the neural networks for encoder Enc_q and decoder Dec accordingly in steps 316 and 318. In other words, the parameters of encoder Enc_q and decoder Dec are modified to further minimize the loss for the next data sample. Notably, the momentum contrastive autoencoder loss is not back propagated through encoder Enc_k. However, at step 320, algorithm 300 may update the parameters of encoder Enc_k by computing a running average estimate of the parameters in encoder Enc_k that are influenced by the parameters of encoder Enc_q. For example, values of the parameters in encode Enc_q may be multiplied by a momentum parameter that is generally less than or is close to one, and the result may be added to the parameters of the encoder Enc_k.

In some embodiments, algorithm 300 may include a dictionary Q that stores a queue of latent variables z_k. The dictionary Q may correspond to the prior distribution and may be used to determine the negative component of the contrastive loss as illustrated in algorithm 300. In some embodiments, at step 322 algorithm 300 may add the newest latent variable z_k to the dictionary Q by replacing the oldest latent variable z_k with the newest latest variable z_k.

Going back to FIG. 2, once momentum contrastive autoencoder 130 is trained, the marginal distribution of the encoder 205 should be close to a uniform distribution over the unit hyper-sphere. In this way, the samples from the learned marginal distribution may be drawn as follows: first sample $z \sim N(0, I)$ from the standard multivariate normal distribution in $\mathbb{R}^d$ is drawn. Next, a sample $x_g := Dec(z/\|z\|_2)$ is generated.

FIG. 4 is a simplified diagram of a method 400 for training the momentum contrastive autoencoder, according to some embodiments. One or more of the processes 402-414 of method 400 may be implemented, at least in part, in the form of executable code stored on non-transitory, tangible, machine-readable media that when run by one or more processors may cause the one or more processors to perform one or more of the processes 402-414.

At process 402, a momentum contrastive autoencoder receives input data. For example, momentum contrastive autoencoder 130 receives input data 140, which may be a set of image data, text data or another type of data as samples x which may or may not be in minibatches. The process 404-414 discussed below may be performed for each sample x.

At process 404, a first and second latent representations are generated. For example, encoder 205 of momentum contrastive autoencoder 130 may generate a latent representation Z 215 for each data sample x in the input data 140. As discussed above, the latent representation Z 215 may be normalized using unit $\ell_2$ normalization. The unit $\ell_2$ normalization may be calculated as the square root of the sum of the squared vector values in each latent representation sample that is included in latent representation Z 215. Encoder 225 of momentum contrastive autoencoder 130 may also generate a latent representation Z from the input data 140, which may also be normalized using unit $\ell_2$ normalization. Even though encoder 205 and encoder 225 have the same structure, the latent representation Z 215 from encoder 205 and the latent representation Z from encoder 225 are different because the parameters of encoder 205 and encoder 335 have different values.

At process 406, output data is determined. For example, decoder 210 of the momentum contrastive autoencoder 130 receives the latent representation Z 215 and generates output data 150.

At process 408, a distribution of a latent space is learned. For example, the latent representation Z 215 is matched to a prior distribution which is a uniform distribution over the unit hyper-sphere $S_d$ such that the contrastive loss is minimized. As discussed above, the contrastive loss includes a positive component and a negative component. The positive component is based on a loss associated with latent representation Z 215 of the first encoder and the latent representation Z of the second encoder. The negative component is associated with the mapping of the latent representation Z 215 to a unit hypersphere. Further, the contrastive loss is minimized when the negative component of the contrastive loss is minimized, which occurs when the mapping of the distribution of latent representation Z 215 is uniform over the unit hypersphere.

At process 410, reconstruction loss is determined. The reconstruction loss is determined by matching input data 140 to output data 150. In some embodiments, the reconstruction loss may be a difference between output data 150 and input data 140.

At process 412, parameters of first encoder and decoder are updated. For example, the contrastive loss and the reconstructive loss may be combined into an overall loss. The parameters of encoder 205 and decoder 210 may then be updated based on the overall loss.

At process 414, parameters of the second encoder are updated. For example, parameters of encoder 225 may be updated based on a moving average of the parameters of encoder 225 and the updated parameters of encoder 205.

Once the parameters are updated, method 400 proceeds to process 404, at which point method 400 repeats until the contrastive loss and the reconstruction loss are minimized.

Figure 5:
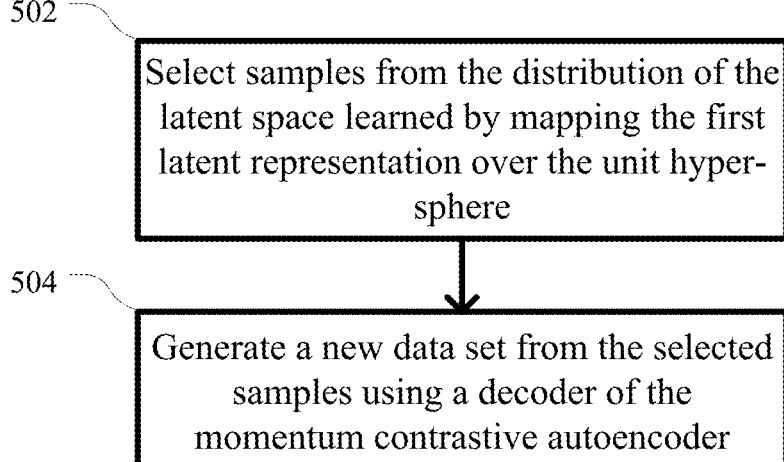
FIG. 5 is a flowchart of method for determining new samples from a data distribution generated by a momentum contrastive autoencoder, according to some embodiments.

FIG. 5 is a simplified diagram of a method 500 for generating a new data set with a trained momentum contrastive autoencoder, according to some embodiments. One or more of the processes 502-504 of method 500 may be implemented, at least in part, in the form of executable code stored on non-transitory, tangible, machine-readable media that when run by one or more processors may cause the one or more processors to perform one or more of the processes 502-504.

At process 502, samples from the learned or marginal distribution of the latent space are selected. For example, momentum contrastive autoencoder 130 may select samples from the distribution of the marginal space learned in FIG. 4. For example, momentum contrastive autoencoder 130 may use the distribution of the latent space learned by mapping latent representation Z to the unit hyper-sphere $S_d$ such that the contrastive loss is minimized.

At process 504, a new data set is generated from the selected samples. For example, decoder 210 may receive samples selected from the distribution of the latent space and generate output data 150. This output data 150 may be the new data set because the input to decoder 210 are samples selected from the distribution of the latent space which may be the same or different samples that encoder 205 generated from input data 140 in method 400.

Figure 6:
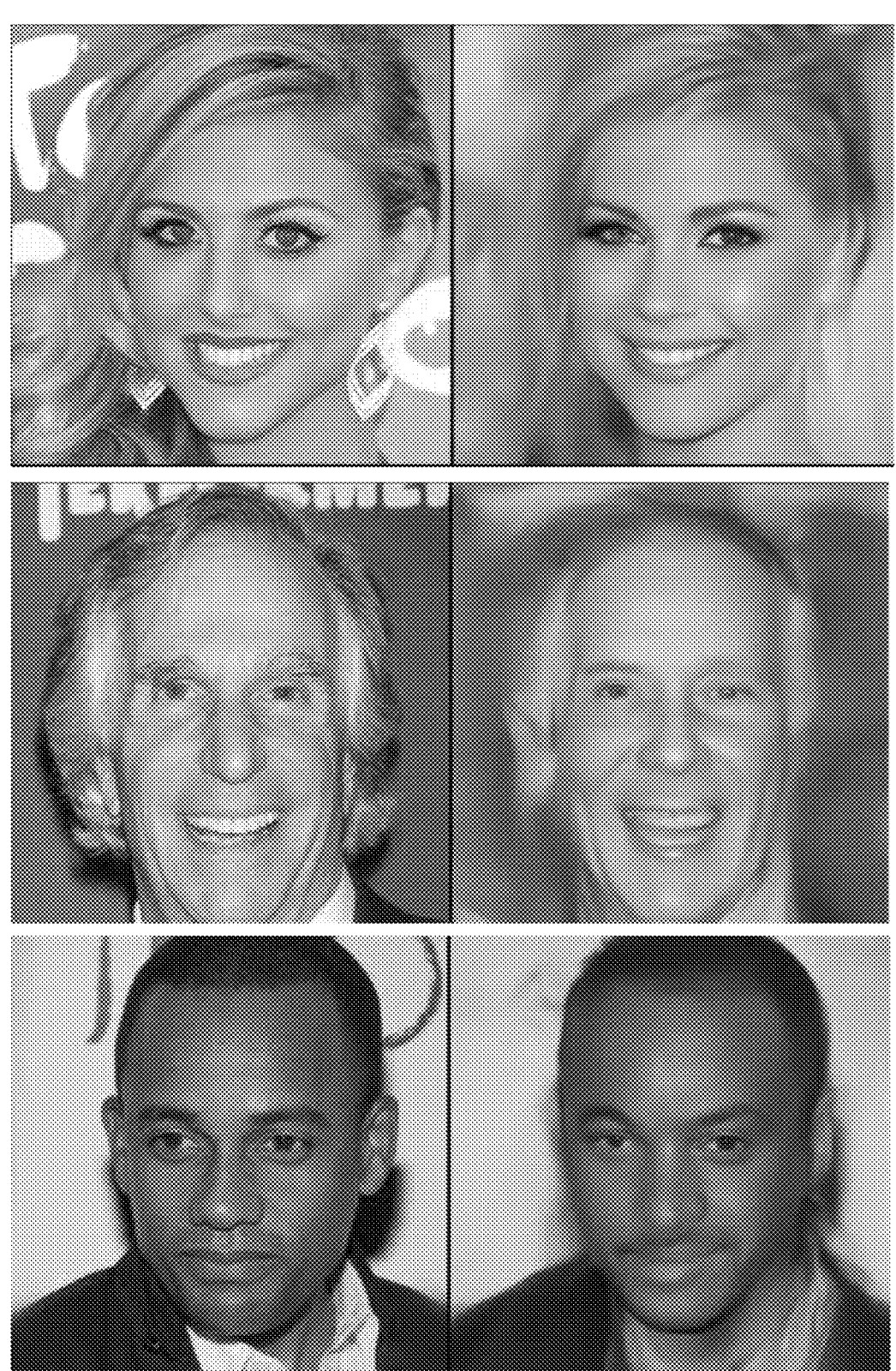
FIG. 6 illustrates original images and images reconstructed by a momentum contrastive autoencoder, according to some embodiments.

In some embodiments, momentum contrastive autoencoder 130 may reconstruct data, such as image data. FIG. 6 is a diagram 600 illustrating original and reconstructed images, according to an embodiment. In FIG. 6, momentum contrastive autoencoder 130 receives images in the first or left column of FIG. 6 and reconstructs images from the first or left column into images in the second or right column, according to some embodiments.

As discussed above, momentum contrastive autoencoder 130 may also generate new images. FIG. 7 is a diagram 700 illustrating new images generated using momentum contrastive autoencoder 130, according to some embodiments.

Some examples of computing devices, such as computing device 100 may include non-transitory, tangible, machine readable media that include executable code that when run by one or more processors (e.g., processor 110) may cause the one or more processors to perform the processes of methods 400 and 500. Some common forms of machine readable media that may include the processes of methods 400 and 500 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

The embodiments of the disclosure are further included in a paper titled "Momentum Contrastive Autoencoder," 12 pages, which is attached to this application as an Appendix.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A system for training a contrastive momentum autoencoder, the system comprising:

one or more non-transitory memories;

one or more processors coupled the one or more memories and configured to execute instructions that cause the one or more processors to perform operations, the operations comprising:

receive an input data set;

encode, using a first encoder neural network comprising first encoder parameters, a first latent representation from the input data set;

encode, using a second encoder neural network having a same structure as the first encoder neural network and comprising second encoder parameters having values that are different from values of the first encoder parameters, a second latent representation from a same input data set as for the first encoder neural network;

determine a contrastive loss using the first latent representation and second latent representation, the contrastive loss based at least on a similarity between the first latent representation and the second latent representation;

decode, using a decoder neural network comprising decoder parameters, the first latent representation into an output data set;

determine a reconstruction loss based on the output data set and the input data set; and update at least one parameter in the first encoder parameters of the first encoder neural network and at least one parameter in the decoder parameters of the decoder neural network based on the contrastive loss and the reconstruction loss.

2. The system of claim 1, the operations further comprising:

after the updating of the at least one parameter in the first encoder parameters, update at least one parameter in the second encoder parameters of the second encoder neural network based on a moving average of the at least one parameter in the first encoder parameters.

3. The system of claim 1, wherein the first encoder is configured to normalize the first latent representation using $l_2$ normalization.

4. The system of claim 3, the operations further comprising:

learning a distribution of a latent space by mapping a distribution of the normalized first latent representation to a prior distribution, wherein the prior distribution is a uniform distribution over a unit hyper-sphere, and wherein the mapping minimizes the contrastive loss based on the first latent representation, the second latent representation, and the prior distribution.

5. The system of claim 4, wherein the contrastive loss includes a positive component associated with a loss based at least on a similarity between the first latent representation and the second latent representation and a negative component associated with a loss that corresponds to mapping the first latent representation to the prior distribution that is the uniform distribution over the unit hyper-sphere.

6. The system of claim 5, wherein the prior distribution is based on prior latent representations encoded by the second encoder neural network.

7. The system of claim 6, the operations further comprising:

updating the distribution of a latent space using the second latent representation encoded by the second encoder neural network.

8. The system of claim 4, the operations further comprising:

retrieving samples from the learned distribution over the latent space; and decoding, using the decoder neural network, the samples into a new output data set.

9. The system of claim 8, wherein the new output data set is a new data set that is different from the input data set and the output data set, wherein the input data set comprises a first image, the output data set comprises a second image, and the new output dataset comprises a third image.

10. The system of claim 1, wherein the first encoder neural network and the second encoder neural network are configured to receive the input data set as multiple mini-batches; and the operations further comprising:

updating the at least one parameter in the first encoder parameters of the first encoder neural network and at least one parameter in the decoder parameters of the decoder neural network based on the contrastive loss and the reconstruction loss associated with a data sample in each mini-batch in the multiple mini-batches.

11. The system of claim 1, further comprising, generating a first output image via the trained decoder neural network and the trained first encoder neural network without the trained second encoder neural network, in response to a first input image.

12. The system of claim 1, wherein the second encoder neural network trains the first encoder neural network such that the first encoder parameters resemble the second encoder parameters after the updating of the at least one parameter in the first encoder parameters and at least one parameter in the decoder parameters.

13. A method for training a contrastive momentum auto-encoder, the method comprising:

receiving a training dataset including images;

encoding, using a first encoder neural network comprising first encoder parameters, a first latent representation from an image in the training dataset input data set;

encoding, using a second encoder neural network having a same structure as the first encoder neural network and comprising second encoder parameters having values that are different from values of the first encoder parameters, a second latent representation from a same image as for the first encoder neural network;

determining a contrastive loss using the first latent representation and second latent representation, the contrastive loss based at least on a similarity between the first latent representation and the second latent representation;

decoding, using a decoder neural network comprising decoder parameters, the first latent representation into an output image;

determining a reconstruction loss using the output image and the image in the training dataset;

updating at least one parameter in the first encoder parameters and at least one parameter in the decoder parameters based on the contrastive loss and the reconstruction loss; and after the first encoder neural network and the decoder neural network is trained:

receiving an input image; and generating, by the trained first encoder neural network and the trained decoder neural network, a reconstructed image in response to the input image.

14. The method of claim 13, further comprising:

after the updating of the at least one parameter in the first encoder parameters, updating at least one parameter in the second encoder parameters of the second encoder neural network based on a moving average of the at least one parameter in the first encoder parameters.

15. The method of claim 13, wherein normalizing using $l_2$ normalization and the first encoder neural network, the first latent representation.

16. The method of claim 15, further comprising:

learning a distribution of a latent space by mapping a distribution of the normalized first latent representation to a prior distribution, wherein the prior distribution is a uniform distribution over a unit hyper-sphere, and wherein the mapping minimizes the contrastive loss based on the first latent representation, the second latent representation, and the prior distribution.

17. The method of claim 16, wherein the contrastive loss includes a positive component associated with a loss between the first latent representation and the second latent representation and a negative component associated with a loss that corresponds to mapping the first latent representation to the prior distribution that is the uniform distribution over the unit hyper-sphere.

18. The method of claim 17, further comprising:

updating the distribution of a latent space using the second latent representation encoded by the second encoder neural network.

19. The method of claim 13, further comprising:

receiving the input data set as multiple mini-batches; and updating the at least one parameter in the first encoder parameters of the first encoder neural network and at least one parameter in the decoder parameters of the decoder neural network based on the contrastive loss and the reconstruction loss associated with each mini-batch in the multiple mini-batches.

20. A non-transitory computer readable medium having instructions thereon, that when executed by a processor cause the processor to perform operations that train a contrastive momentum autoencoder, the operations comprising:

receiving an input data set;

encoding, using a first encoder neural network comprising first encoder parameters, a first latent representation from the input data set;

encoding, using a second encoder neural network having a same structure as the first encoder neural network and comprising second encoder parameters having values that are different from values of the first encoder parameters, a second latent representation from a same input data set as for the first encoder neural network;

determining a contrastive loss using the first latent representation and second latent representation, the contrastive loss based at least on a similarity between the first latent representation and the second latent representation;

decoding, using a decoder neural network comprising decoder parameters, the first latent representation into an output data set;

determining a reconstruction loss based on the output data set and the input data set; and updating at least one parameter in the first encoder parameters and at least one parameter in the decoder parameters based on the contrastive loss and the reconstruction loss.

* * * * *